United States Patent [19]

Chauvigne

[11] Patent Number: 4,563,911

[45] Date of Patent: Jan. 14, 1986

[54] PROGRAMMER CONTROL DEVICE

[75] Inventor: Michel Chauvigne, Cluses, France

[73] Assignee: Societe Industrielle de Bellevaux Sibel, Cluses, France

[21] Appl. No.: 628,340

[22] Filed: Jul. 6, 1984

[51] Int. Cl.[4] .............................................. F16H 29/12
[52] U.S. Cl. .................................. 74/125; 74/577 M; 74/568 T
[58] Field of Search ............... 74/116, 118, 122, 125, 74/568 T, 577 M

[56] References Cited

U.S. PATENT DOCUMENTS

| | | | |
|---|---|---|---|
| 3,724,248 | 4/1973 | Obermann | 74/122 |
| 3,857,293 | 12/1974 | Godwin et al. | 74/118 |
| 4,179,945 | 12/1979 | Obermann | 74/122 |
| 4,228,690 | 10/1980 | Ring | 74/568 T |
| 4,319,101 | 3/1982 | Bolin | 74/116 |
| 4,467,664 | 8/1984 | Willigman et al. | 74/116 |

FOREIGN PATENT DOCUMENTS 2162073  7/1973  France .

Primary Examiner—Lawrence J. Staab
Attorney, Agent, or Firm—Robert E. Burns; Emmanuel J. Lobato; Bruce L. Adams

[57] ABSTRACT

The present invention relates to a programmer control device.

This device comprises a rotary cam block 5 intended to be driven step by step by an advancing device comprising three advancing pawls 21, 22, 23 mounted on an oscillating support. The first pawl 21 can directly actuate step by step the first toothed ring 31 integral with the first part 1 of the cam block 5. The second pawl 22 interacts under the action of an elastic means with the smooth periphery 25 of a cylindrical extension 26 forming part of the second part 2 of the cam block 5. It likewise interacts, via orifices 30 passing completely through this extension 26, with a second toothed ring 32 integral with the first part 1. The third pawl 23 interacts under the action of an elastic means with a third toothed ring 33 integral with the inner periphery of a rate reduction collar 3 mounted rotatably inside the second part 2 of the cam block 5. It likewise interacts, via orifices 40 passing completely through the collar 3, with a fourth toothed ring 34 integral with the second part 2 of the cam block 5.

The present control device can be used particularly in programmers intended for controlling clothes washing machines.

3 Claims, 3 Drawing Figures

PROGRAMMER CONTROL DEVICE

The present invention relates to programmer control devices, comprising a rotary program cam block capable of being driven automatically in rotation step by step by a step-by-step advancing device comprising a support intended for oscillating at each revolution of an advancing cam. This support supports several advancing pawls arranged side by side and capable of interacting respectively with the inner periphery and outer periphery of the program cam block, which comprises a first part and a second part mounted rotatably on the first and provided with a cylindrical extension located respectively on the inside and on the outside of the first part. The first pawl is capable of interacting with a first toothed ring integral with the first part of the cam block. A second pawl interacts constantly under the action of an elastic means respectively with the inner periphery and outer periphery of the extension of the second part of the cam block or, via at least one orifice passing completely through this extension, with a second toothed ring integral with the first part of the cam block, this toothed ring being located immediately behind the said orifice.

In known programmer control devices of this type, such as that described in French Pat. No. 2,162,073, the cylindrical extension of the second part of the cam block is mounted rotatably inside the first part of the latter. The inner periphery of this cylindrical extension is provided with barbs intended for interacting with the pawls other than the first during each to-and-fro movement of all the pawls and of their common oscillating support. Thus, these other advancing pawls directly drive the second part of the cam block step by step constantly, even when one of them passes through one of the orifices provided through the cylindrical extension of the second part of the cam block. This pawl can then interact in this way with the second toothed ring integral with the first part of the cam block and drive this first part of the cam block in rotation one step.

In an embodiment corresponding to the above patent, the second part of the cam block, which comprises the rapid-advance cams intended particularly for controlling the successive reversals of the direction of rotation of the drum of a washing machine, is actuated by one of the pawls the amount of one tooth every four seconds, and it executes one revolution in four minutes. In the event that the second ring possesses, for example, two orifices allowing a pawl to pass, the first part of the cam block thus advances one step every two minutes. In turn, since the first pawl, when controlled to act on the first toothed ring integral with the first part of the cam block, is driven by the oscillating support at the same rate as the other pawls, it actuates this first part of the cam block one step every four seconds, but this is too slow when it is intended to pass quickly over steps which are not used in some programs. Moreover, such a solution, which could be considered as barely acceptable hitherto, is no longer acceptable at all because new standards relating to the interference suppression of circuit breakers actuated by the cam block demand that these circuit breakers be actuated very quickly, approximately in less than 0.2 seconds. This actuating speed of the circuit breakers can be achieved when the cam block is advanced one step in less than one second.

With the device of the prior art, a solution would be to actuate the oscillating support of the pawls at a faster rate, for example every second. Thus, the first pawl could directly cause the advance of the cam block one step each second, and this would be an appropriate rate should the intention be to pass quickly over steps which are not needed. However, the other pawls would thus actuate one step per second the second part of the cam block which would therefore execute one revolution per minute, all things moreover remaining unchanged, but this would be much too high a speed for the second part of the cam block during the execution of the actual program, a speed of one revolution in two minutes being more suitable, particularly to prevent too rapid wear of the component elements.

The present invention proposes to make it possible to produce a programmer control device capable of causing either one of the two parts of the cam block to advance rapidly each step, for example in one second, so as to actuate relatively more quickly the corresponding circuit breakers, for example within 0.2 seconds, and at the same time make it possible to actuate the first part of the cam block step by step at the same rapid rate under the action of the first pawl, so as to pass over steps not required, whilst on the other hand maintaining a relatively slow rotational speed of the order of one revolution in four minutes for the second part of the cam block, and a relatively slow rate of advance, for example of the order of one step every two or four minutes, for the first part of the cam block, as is the case in the devices of the prior art.

The programmer control device which is the subject of the present invention is defined in that the periphery of the extension of the second part of the cam block, with which the second pawl interacts, is smooth, a third pawl interacting constantly under the action of an elastic means, on the one hand, with a third toothed ring integral respectively with the inner periphery and outer periphery of a rate reduction collar mounted rotatably on the inside and on the outside of the second part of the cam block respectively, and, on the other hand, via at least one orifice passing completely through this rotary collar, with a fourth toothed ring integral with the second part of the cam block, this fourth toothed ring being located immediately behind the said orifice. The smooth surface allows the second pawl to oscillate freely by sliding on the smooth surface.

The attached drawings illustrates by way of example an embodiment of the control device according to the present invention.

Figure 1:
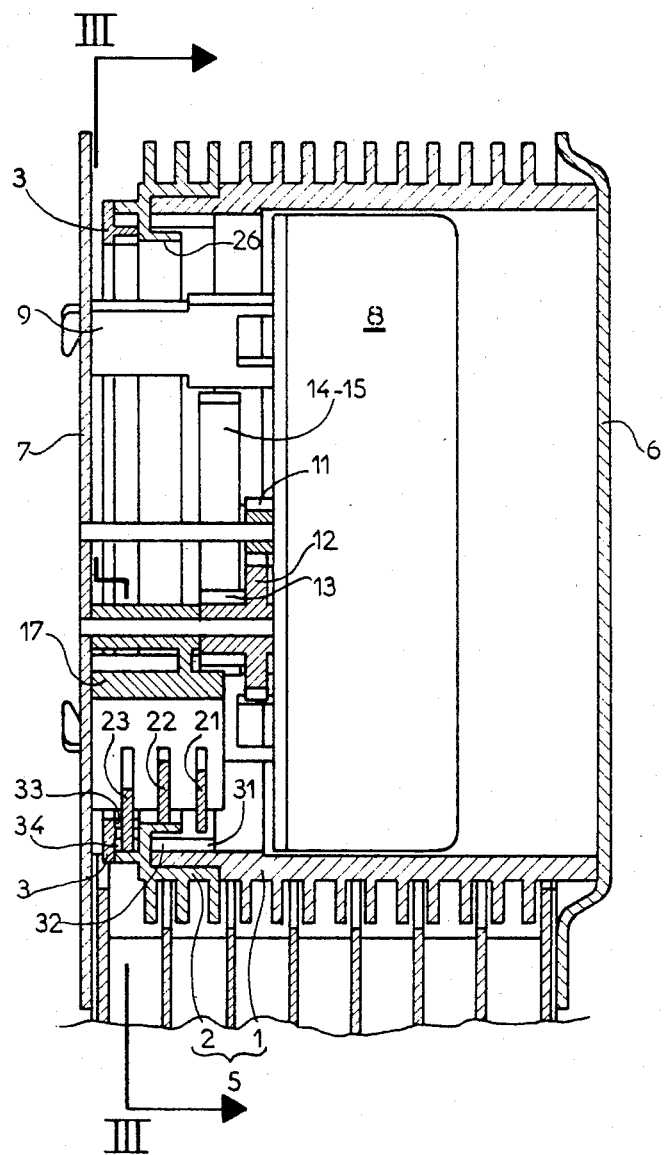
FIG. 1 shows the said embodiment seen in a section along the line I—I of FIG. 3.
Figure 2:
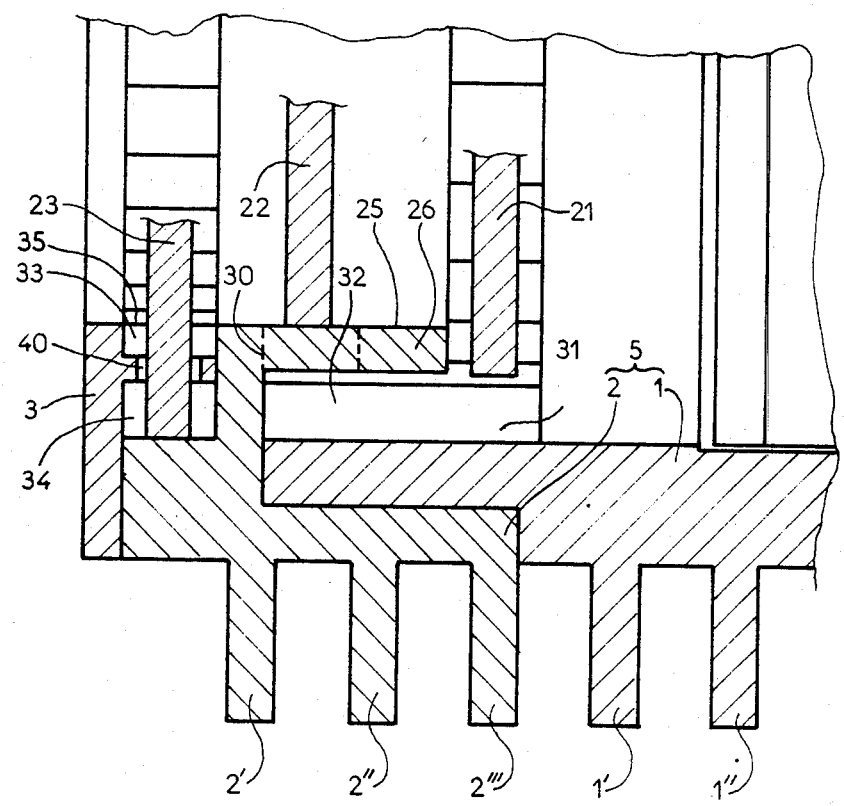
FIG. 2 shows part of FIG. 1 on a larger scale.
Figure 3:
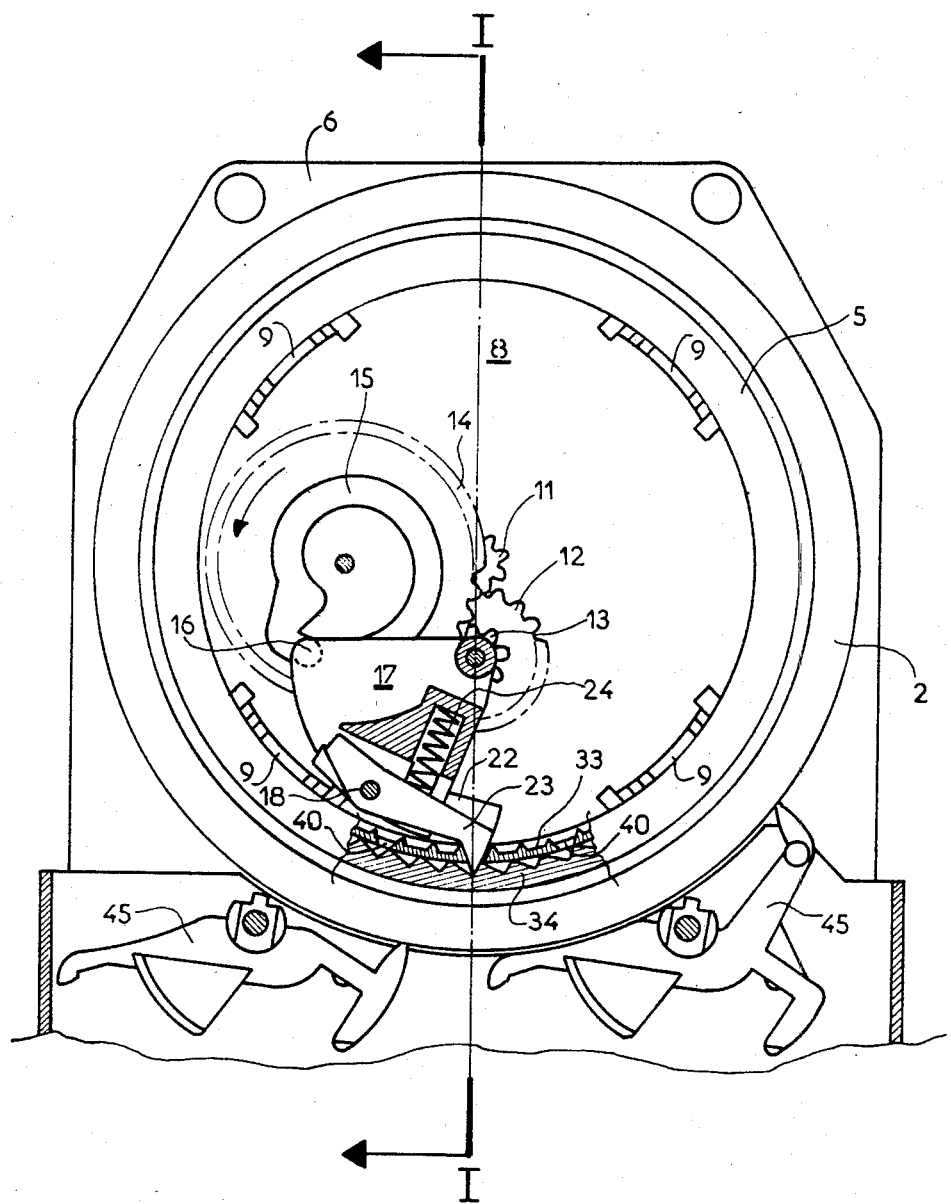
FIG. 3 shows the same embodiment seen in a section along the line III—III of FIG. 1.

As illustrated in FIGS. 1 to 3, the programmer control device according to the invention comprises a rotary program cam block 5 which, in this exemplary embodiment, is hollow and is retained axially and radially between two metal plates 6 and 7. Located inside this rotary cam block 5 is a micro-motor 8 which is fixed to the plate 7 by means of struts 9. This micro-motor 8 carries on its output shaft a toothed pinion 11 which is engaged with the gear wheel 12 of a movable body, the toothed pinion 13 of which is engaged with a gear wheel 14. This gear wheel 14 is integral with an advancing cam 15. With the micro-motor 8 rotating at 750 revolutions per minute in this example, the toothed elements 11, 12, 13, 14 have numbers of teeth selected so that the advancing cam 15 rotates at a speed of one revolution per second.

This advancing cam 15 has a snail-shaped profile recessed in one of its lateral faces. Accommodated in this recessed profile is a drive finger 16 which forms part of an oscillating support 17 intended for oscillating at each revolution of the advancing cam. In this example, this oscillating support 17 supports three advancing pawls 21, 22, 23 arranged side by side and pivoted about a common shaft 18 fastened to the oscillating support 17.

The first advancing pawl 21 is capable of interacting with the barbs provided on the inner periphery of a first toothed ring 31 integral with a first part 1 of the cam block 5. This first part has on the outside the profiles 1', 1", etc., of the actual program cams. This first advancing pawl 21 tends constantly, under the action of a draw spring not shown in the drawing, to be kept out of reach of the teeth of the first toothed ring 31, except when an electromagnet, also not shown in the drawing, is controlled, for example, by an external sensor. It then pushes this first pawl 21 into the teeth of the said first toothed ring 31 by means of an elastic lever, as described, for example, in the above-mentioned French Pat. No. 2,162,073.

The cam block 5 possesses a second part 2 which is cylindrical and, in this example, is mounted rotatably about the first part 1. This second part 2 has on its outer periphery the so-called "rapid" cams 2', 2", 2''', which are generally used to control the changes in direction of rotation of the motor driving the drum of a washing machine. It also supports a cylindrical extension 26 which extends on the inside of the inner periphery of the first part 1.

The second advancing pawl 22 interacts constantly, under the action of a compression spring 24 located in a receptacle of the oscillating support 17, with a smooth inner periphery 25 of the cylindrical extension 26. Two orifices 30 (FIG. 2), diametrically opposite one another and passing completely through the extension 26, open onto the smooth periphery 25 on which the second advancing pawl 22 bears. These orifices are sufficiently large to allow the nose of the said pawl 22 to pass, and this can then interact with a second toothed ring 32 integral with the first part 1 of the cam block 5. In this exemplary embodiment, this second toothed ring 32 is identical to the first 31 and forms the extension of the latter. This second toothed ring 32 is located immediately behind the two orifices 30.

As illustrated in FIGS. 1 to 3, the third advancing pawl 23 interacts constantly under the action of another compression spring 24, on the one hand, with a third toothed ring 33, comprising 60 teeth in this example and integral with the inner periphery 35 of a rate reduction collar 3 (FIG. 2) mounted rotatably inside the second part 2 of the cam block 5, and, on the other hand, via orifices 40 passing completely through this rotary collar 3, with a fourth toothed ring 34 likewise possessing 60 teeth in this example and integral with the second part 2. In fact, the reduction collar bears on the tips of the teeth of the fourth toothed ring 34 and in this example possesses 15 orifices 40 distributed uniformly over its periphery. Thus, the fourth toothed ring 34 is located immediately behind the 15 orifices 40.

The cams 1', 1", etc., and 2', 2", 2''' are designed to actuate rocker levers 45 which themselves actuate circuit breakers not shown in the drawing.

When the micro-motor 8 is supplied with current, the advancing cam 15 executes 60 revolutions per minute, and the pawl support 17 and the three pawls 21, 22, 23 oscillate 60 times per minute. For example, the first pawl 21 oscillates freely without being engaged with the first toothed ring 31. The second pawl 22, during its oscillations, remains up against the smooth part 25 of the extension 26. The third pawl 23, during each of its oscillations, drives by the amount of one tooth the third toothed ring 33 of the reduction collar 3 which thus executes one revolution in one minute. Because of the 15 orifices 40, the third pawl 23 every four teeth drives, via these orifices 40, the amount of one tooth each time the fourth toothed ring 34 of the second part 2 which thus executes one revolution in four minutes. During this step-by-step advance of the second part 2 of the cam block 5 in the course of each revolution of this second part 2, the second pawl 22 falls in succession into each of the two orifices 30 and each time drives by the amount of one tooth the second toothed ring 32 of the first part 1 which thus advances one step every two minutes.

When the first pawl 21 is brought into engagement with the teeth of the first toothed ring 31, for example in response to a command from the corresponding external sensor, the first pawl 21 which oscillates 60 times per minute drives the first toothed ring 31 and the first part 1 of the cam block 5 at the same accelerated rate. Thus, when necessary, it is possible to pass very quickly over steps which are not needed in certain programs.

During their common oscillation at the rate of 60 times per minute, each of the three pawls, when it acts on one of the toothed rings, causes the element, with which the said toothed ring is integral, to advance one step in one second. The circuit breakers can thus be actuated very rapidly in less than 0.2 seconds.

The present invention can be used particularly in devices for controlling programmers used to control clothes washing machines.

I claim:

1. A programmer control device comprising a rotary cam block comprising a first part and a second part which are rotatable relative to one another, a rate reduction collar rotatable relative to said cam block and having an integral toothed ring having at least one orifice therein, said second part of said cam block having a toothed ring underlying said toothed ring of said rate reduction collar, said second part of said cam block further having a smooth ring having at least one orifice therein, and said first part of said cam block having a toothed ring having a first portion underlying said smooth ring of said second part and a second portion not underlying said smooth ring, an oscillatable support having three pawls pivotally mounted thereon and means for oscillating said support at a predetermined rate, said pawls comprising a first pawl resiliently engaging teeth of said toothed ring of said rate reduction collar to advance said collar as said support oscillates and also extending through said orifice in said toothed ring of said rate reduction collar to engage teeth of said toothed ring of said second part of said cam block to advance said second part of said cam block at a lower rate than said rate reducing collar, a second pawl resiliently engaging said smooth ring of said second part of said cam block and extending through said orifice in said smooth ring to engage teeth of said first portion of said toothed ring of said first part of said cam block to advance said first part at a lower rate than said second part of said cam block, and a third pawl selectively engageable with said second portion of said toothed ring of said first part of said cam block to advance said first part rapidly.

2. A programmer control device according to claim 1, in which said second part of said cam block has a portion surrounding and rotatable on a portion of said first part of said cam block and in which said rate reduction collar comprises an annular plate at an end of said second part of said cam block.

3. A programmer control device according to claim 1, in which said pawls are pivotally mounted on said oscillatable support with a common pivotal axis.

* * * * *